July 23, 1946. J. S. REEVES 2,404,457
DECORTICATING MACHINE
Filed March 25, 1944 5 Sheets-Sheet 2

INVENTOR.
John S. Reeves.
BY
Cameron, Kerkam + Sutton
ATTORNEYS

July 23, 1946.   J. S. REEVES   2,404,457
DECORTICATING MACHINE
Filed March 25, 1944   5 Sheets-Sheet 3
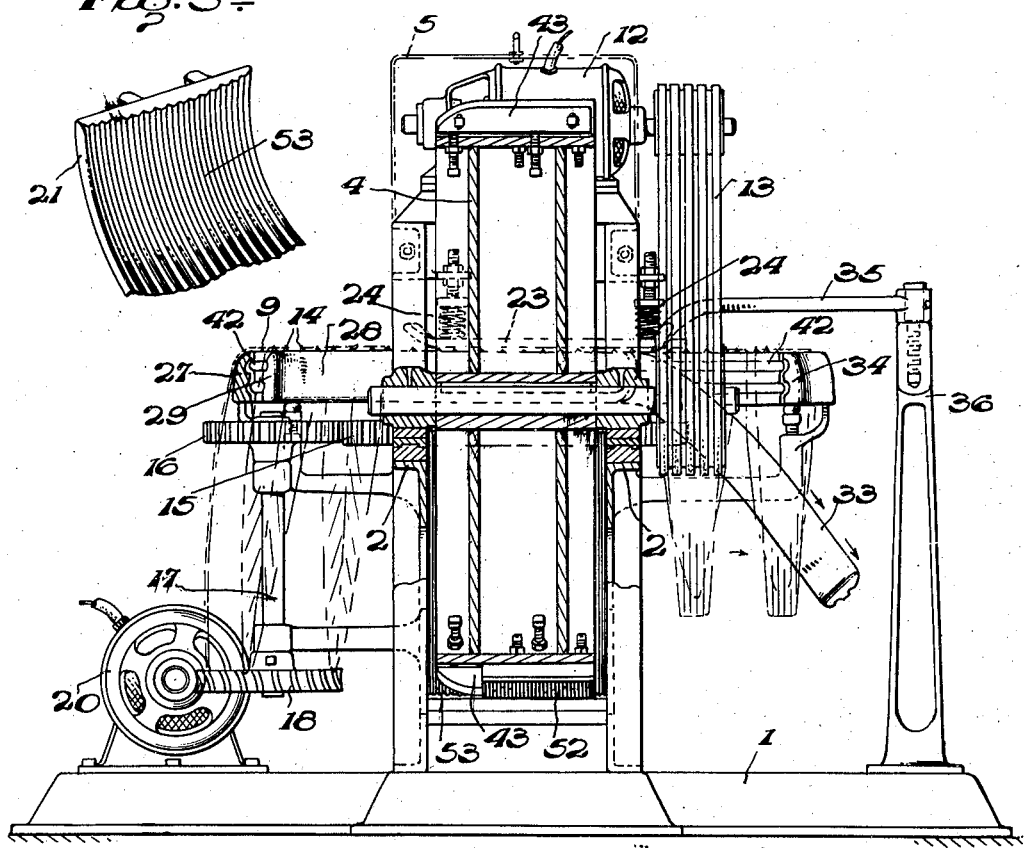
Fig. 3.
Fig. 3a.
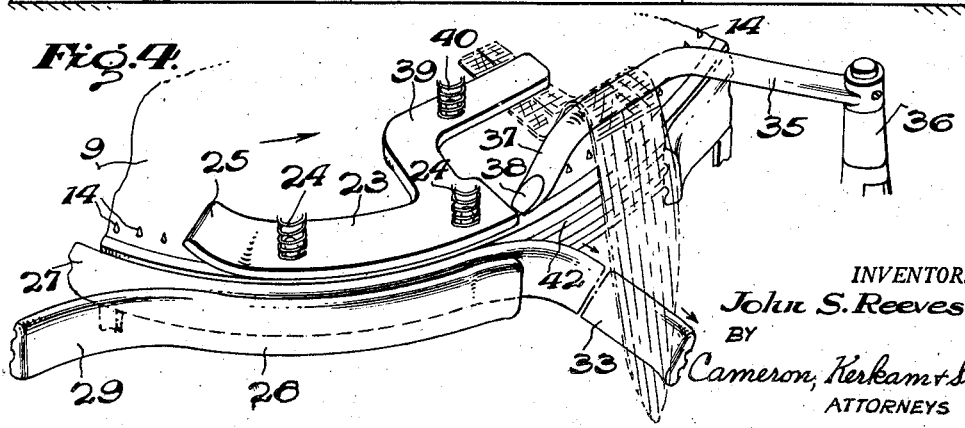
Fig. 4.
INVENTOR.
John S. Reeves.
BY
Cameron, Kerkam & Sutton
ATTORNEYS

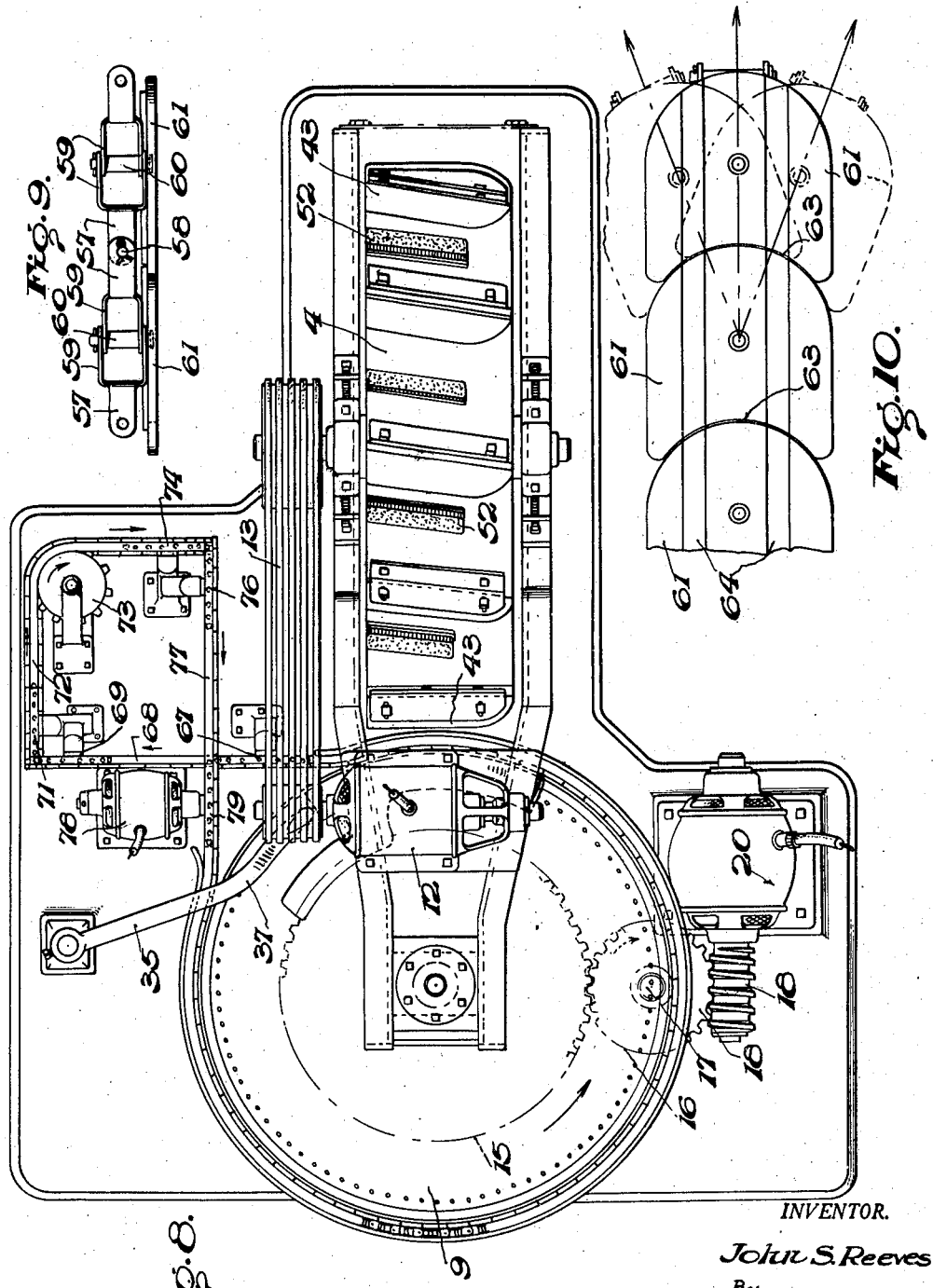

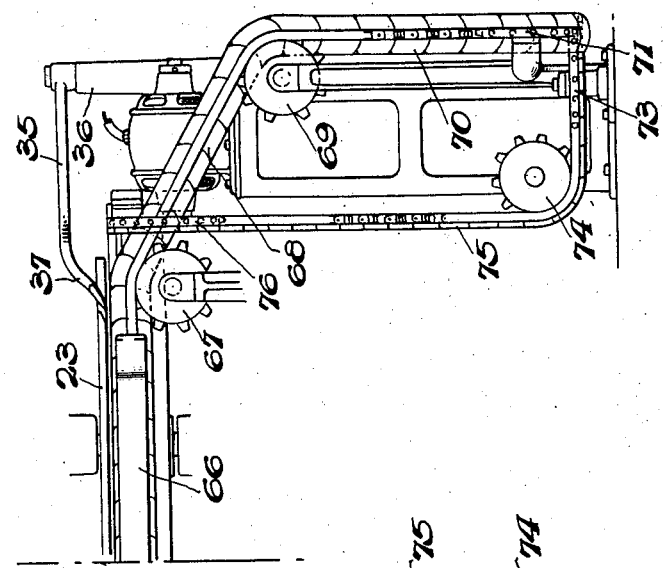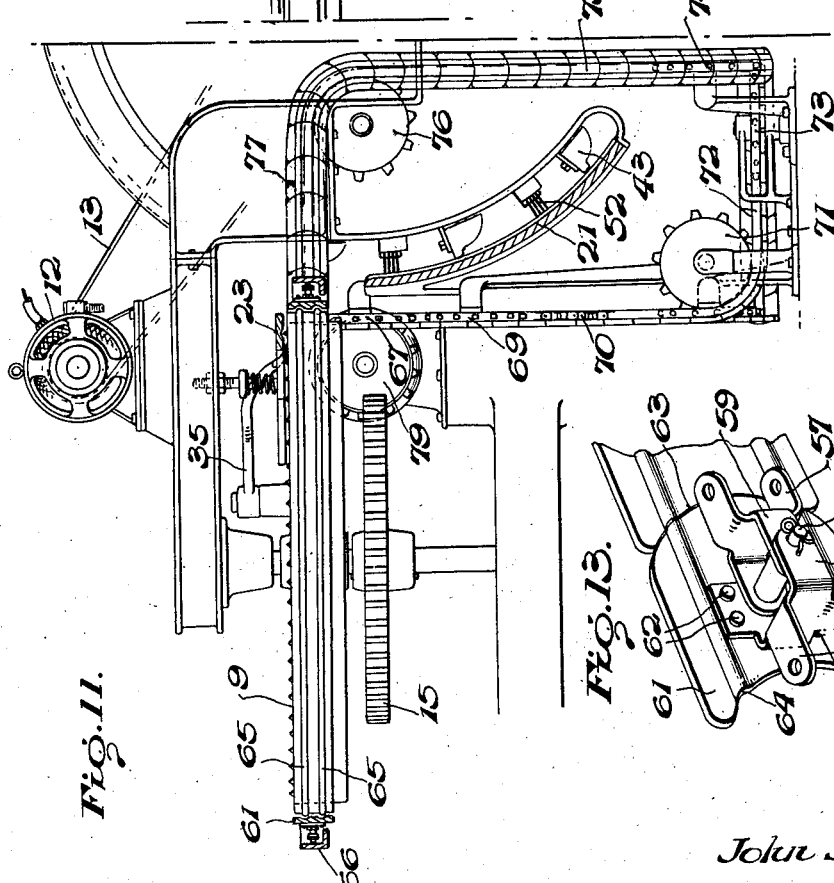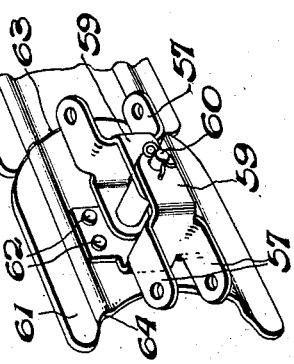

Patented July 23, 1946

2,404,457

UNITED STATES PATENT OFFICE 2,404,457

DECORTICATING MACHINE

John S. Reeves, Baltimore, Md.

Application March 25, 1944, Serial No. 528,128

12 Claims. (Cl. 19—16)

This invention relates to decorticating machines particularly adapted for the production of fiber from the leaves of plants of the Agave family, such as Sansevieria, cabulla, Maya, pita flora, henequen, and the like.

The leaves of such plants are long and relatively narrow and contain longitudinal white fibers which can be recovered by cleaning away the pulp, juice, etc. In the usual machine this waste material, referred to as bagasse, is stripped from the leaves by scutching blades mounted on the periphery of a rotating wheel or drum. The leaves hang downwardly over an arcuate scutching face substantially concentric with the wheel, the blades exerting a squeezing and scraping effect which travels progressively along the leaves toward their free ends, stripping away the bagasse. The clearance between the scutching surface and blades must be very small to insure efficient cleaning, i. e., on the order of several thousandths of an inch.

To provide complete cleaning of the leaves from butt to tip, they are held first so that one end hangs down over the scutching face and this half of the leaf is cleaned, and then the leaves are automatically reversed and held by the cleaned fiber while the other end or half is being cleaned. The second cleaning operation may be accomplished by a second scutching wheel as in my prior Patent No. 2,341,290, or each leaf may be caused to pass the same scutching wheel twice, once for each end to be cleaned. The present invention relates particularly to a machine of the latter type.

One of the objects of the invention is to provide such a machine of novel and improved design and construction which is simple and inexpensive with a minimum of moving parts to deteriorate or wear out in service, thus reducing construction and maintenance cost and providing greater safety for personnel.

Another object is to provide an improved form of scutching face which enables very close clearance to be maintained for effective cleaning while at the same time too great compression of the fibers themselves with consequent damage or breaking is avoided.

A further object is to provide an improved form of scutching device or blade for crushing and stripping away the bagasse from the leaves.

Two embodiments of the invention have been illustrated in the accompanying drawings but it is to be expressly understood that said drawings are for purposes of illustration only and are not to be taken as a definition of the limits of the invention, reference being had to the appended claims for this purpose.

In the drawings,

Fig. 3 is a section on the line 3—3 of Fig. 2;

Fig. 3a is a detail view showing a scutching support;

Fig. 4 is a detail view in perspective of a part of the apparatus;

Figs. 5 and 6 illustrate the shape of the scutching blades;

Fig. 7 is an enlarged detail showing the action of the scutching blade;

Fig. 8 is a plan view of another embodiment of the invention;

Figs. 9 and 10 are detail views of a chain mechanism used in the apparatus of Fig. 8;

Fig. 11 is a side view of Fig. 8, working from the bottom of the latter figure;

Fig. 12 is a partial side view of Fig. 8 looking from the right-hand side of the latter figure and showing the details of the chain drive; and Fig. 13 is a perspective detail of the chain.

Figure 1:
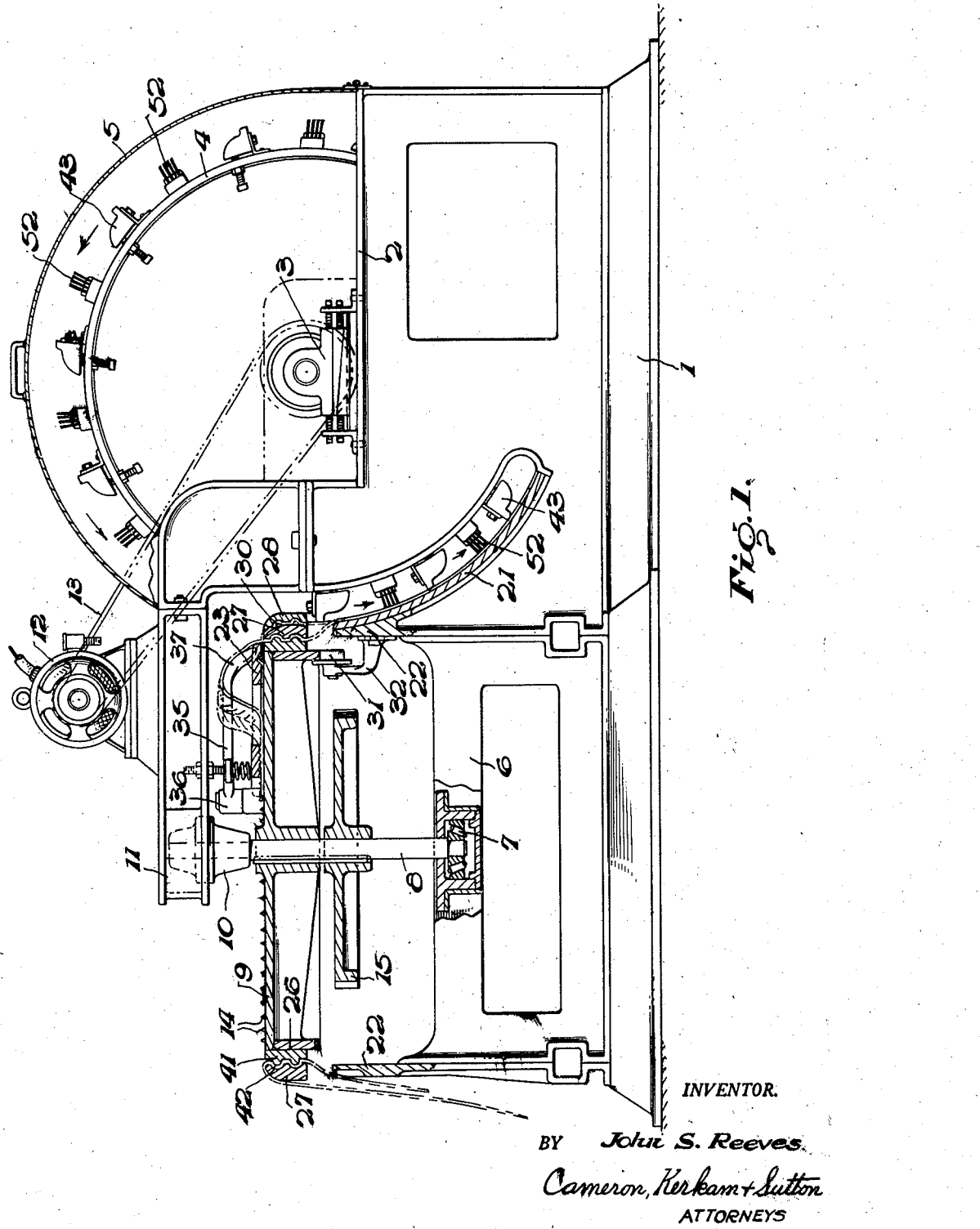
Fig. 1 is a side view of an apparatus embodying the invention.

Referring first to Figs. 1 to 7, inclusive, the machine in general comprises a suitable frame carrying a horizontal conveying table which rotates on a vertical axis and is provided at one side with a scutching support and wheel cooperating therewith. Leaves to be cleaned are fed to the machine in any suitable manner and are carried twice past the scutching wheel in order to clean both ends or halves of the leaves as described above, the cleaned fiber being thereafter discharged automatically from the machine.

In the form shown, the machine frame comprises a bed 1 which is built up at one side to form horizontal supports 2 for the bearings 3 of a scutching wheel indicated generally at 4. The upper half of the wheel may be enclosed in a suitable casing 5. The horizontal frame members 6 support a step bearing 7 for the shaft 8 of a rotating conveying table 9, the upper end of the shaft having a bearing 10 carried by the frame members 11. The members 11 also support a motor 12 which drives the scutching wheel 4 in any suitable manner as by a belt 13.

Leaves to be cleaned are fed to the top of the table 9 at one side thereof in any suitable manner (e. g., at the lower side of Fig. 2) and are conveyed by the table past the scutching wheel 4 as hereinafter described. The upper surface of the table is provided with any suitable means for engaging the leaves, such as the projecting pins 14, and is rotated in any suitable manner as by means of the gear wheel 15 carried by the shaft 8 and driven by a pinion 16 on a vertical shaft 17 the lower end of which carries a worm wheel 18 meshing with a worm 19 driven by a motor 20.

As each leaf approaches the scutching wheel, one of its ends is held on the table top and the leaf is bent downwardly over the periphery of the table so that its lower half is in position to pass over a curved scutching support 21 secured in any suitable manner to the circular frame member 22. In the form shown, the end of the leaf is held on the table top by a presser bar 23 grooved to receive the pins 14 and pressed downwardly into engagement with the top of the table by suitable springs 24, the end of the bar being preferably curved upwardly at 25 to ride over the approaching leaves. This bar cooperates with the marginal surface of the table throughout the region in which the leaves are subjected to the scutching action, beginning before the leaves reach the scutching wheel and terminating at any suitable point after they leave the scutching wheel.

The depending flange 26 of the table is surrounded throughout a considerable portion of its circumference by a curved bar 27 for a purpose described hereinafter, and the leaves are bent positively down over the bar 27 by the following means. A leaf-holding member 28 cooperates with the outer surface of the bar 27 adjacent the scutching wheel, the end 29 of said member being bent away from the periphery of the table. The weight of the ends of the leaves projecting beyond the periphery of the table causes them to bend downwardly enough to pass under the end 29 after which they are bent sharply downward between the members 27 and 28 as they reach the scutching wheel. The cooperating surfaces of the members 27 and 28 are preferably provided with interengaging ribs and grooves indicated at 30 in Fig. 1 to assist in holding the leaves against the downward pull of the scutching wheel. Preferably the periphery of the table 9 is also supported adjacent the scutching wheel against this same downward pull, as by means of a roller 31 carried by a bracket 32 secured to the frame portion 22.

As the leaves pass the scutching wheel and move onward with the rotating table, the lower halves comprise depulped and cleaned fiber. Shortly beyond the scutching wheel, the member 28 terminates and the member 27 is bent away from the periphery of the table and also inclined downwardly at 33. Beyond this point means are provided for elevating the middle portion of the leaf so that the depending cleaned fiber is also elevated and pulled over the inclined extension 33, this action taking place before the fiber reaches the end 34 of the member 27. In the form shown, this is accomplished by a bar 35 carried by a post 36 and having a downwardly inclined portion 37 terminating in a relatively sharp edge 38 which bears on the margin of the table surface adjacent the end of the presser bar 23. Hence as the leaves emerge from under the bar 23, they ride up the incline 37 as shown in Fig. 4, the uncleaned ends being however held on the table top by suitable means such as the extension 39 of the presser bar 23 which may be provided with an additional spring 40.

The elevated fiber hanging down from the bar 35 then passes under the end 34 and between the member 27 and the periphery of the table, the cooperating surfaces between which the fiber is engaged being suitably shaped for good holding action. As shown the table periphery carries a band 41 which is provided with ribs 42 engaging in corresponding grooves in the inner surface of the bar 27. The uncleaned ends of the leaves now emerge from under the presser bar extension 39, and as the cleaned fiber advances the bar 35 pulls the uncleaned ends of the leaves off the top of the table and causes them to drop down over the outer surface of the member 27. The leaves in this position are carried around the table past the loading station and again under the member 28 so that the uncleaned halves now pass over the scutching support 21 and are cleaned. As the fully cleaned leaves move past the scutching wheel beyond the end of the member 28, they slide down the inclined end 33 of the member 27 which thus comprises a means for discharging the cleaned fiber from the machine.

The periphery of the scutching wheel 4 carries a plurality of scutching blades 43 which are preferably of the type illustrated in detail in Figs. 5, 6 and 7. For the purpose of clearly describing and illustrating the preferred shape of the scutching blades, Figs. 5 and 6 show one suitable way of making such blades. The operation begins with a blank of circular cross section tapered at one end to a nose as shown in Fig. 6, this blank being subsequently quartered along the lines 44 of Fig. 5 to form four of the blades 43. Before this is done, however, notches 45 are ground or otherwise suitably formed in the surface of the blank, these notches extending in an axial direction and each being substantially parallel to but spaced from one edge of one of the quadrantal bodies subsequently to be cut from the blank.

Figure 2:
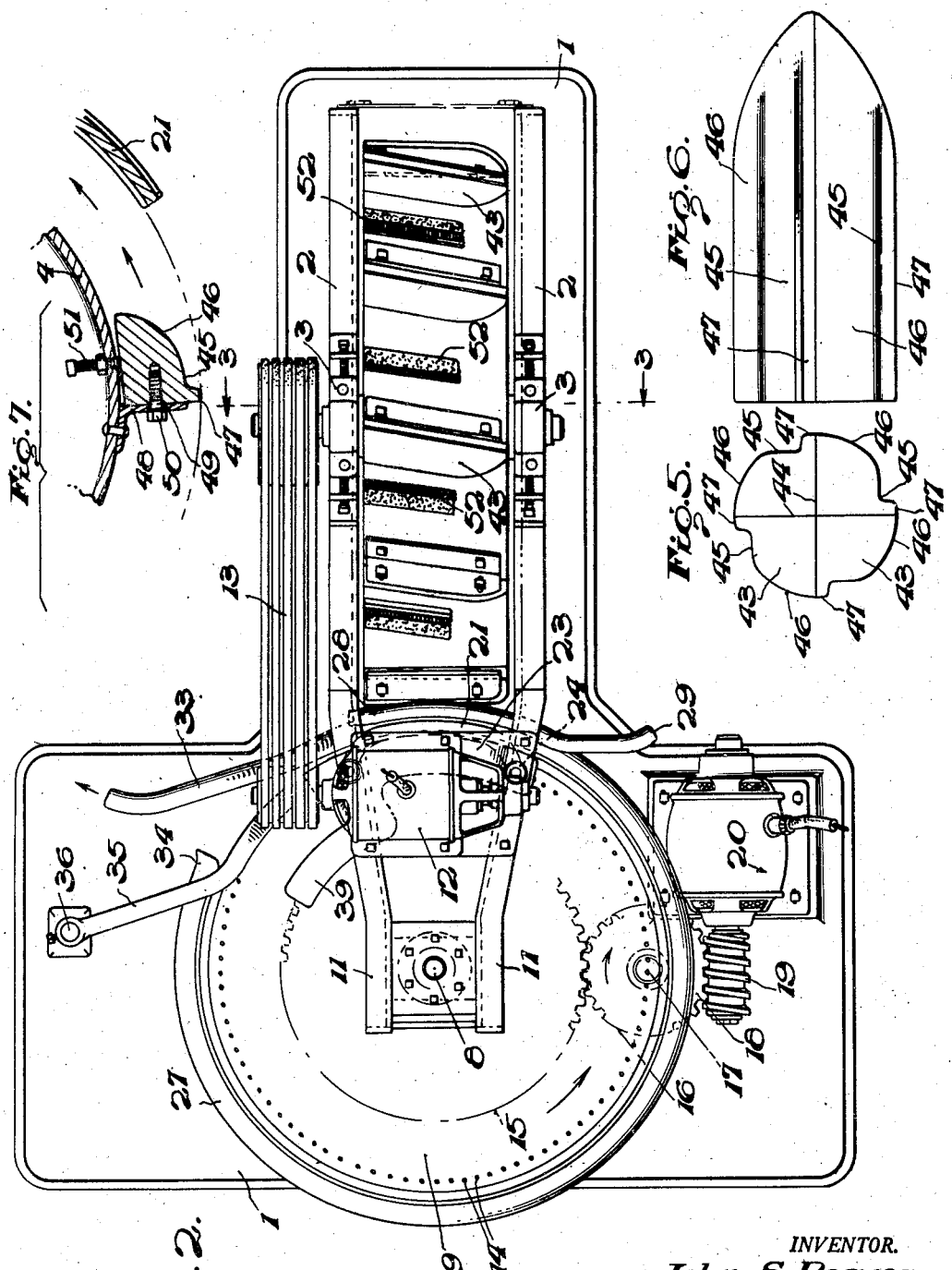
Fig. 2 is a plan view of Fig. 1.

Hence each blade when completed comprises an arcuate surface 46 and a scraping blade 47 throughout most of its length, but tapers off to a point at one end. As shown in Fig. 2, these blades are mounted on the periphery of the scutching wheel at a slight angle to its axis with their tapered ends at the side of the wheel approached by the leaves and with their arcuate surfaces 46 in advance of the blades 47 with respect to the direction of rotation of the wheel. Preferably the blades are adjustably mounted by suitable means such as angles 48 having radial slots 49 wherein the blade-holding screws 50 can be adjusted and adjusting screws 51 projecting through the surface of the scutching wheel. The mass of leaves hanging down and moving across the scutching support are first crushed down against the support lightly by the tapered ends of the blades, and as they move farther across the support they are crushed down to a greater extent by the arcuate portions 46 and then scraped by the blades 47. Brushes 52 are preferably mounted on the periphery of the scutching wheel between the blades to assist in cleaning the fiber.

As noted above, it is necessary for effective cleaning of the leaves that the scraper blades 47 be adjusted to a very close clearance relative to the scutching support, i. e., on the order of several thousandths of an inch. It is found that due to this small clearance, there is a tendency for the blades to break off the fiber particularly in the case of varieties of leaves in which the fiber is relatively fine. I have found that this breaking and damaging of the fibers can be minimized or entirely prevented by forming the surface of the scutching support 21 with corrugations or grooves extending longitudinally of the support in the direction of movement of the blades relative thereto. This construction is illustrated in detail in Fig. 3a, in which the scutching surface 53 is provided with a plurality of longitudinal grooves or corrugations. These grooves are preferably quite small, good results having been obtained with grooves which are 0.01 inch wide and 0.003 inch deep. They provide space for the fibers so that they are not subjected to undue compression between the scraping blades and the scutching surface, thereby minimizing damage to the product.

Either one or both of the members 27 and 28 can be replaced by chains running in engagement with the periphery of the table as illustrated by Figs. 8–13, inclusive, which show an apparatus corresponding in construction and operation to the apparatus of Figs. 1–7 except that it has a moving chain in place of the stationary bar 27 (the member 28 or a chain equivalent thereof being omitted for simplification). Hence the construction and operation of this apparatus will be apparent from the foregoing description, except as to the details of the chain mechanism.

For reasons appearing hereinafter, it is desirable that the chain be capable of turning in two planes at right angles to each other and Figs. 9, 10 and 13 illustrate a chain construction of this type. This chain comprises alternate link members which are the same in construction but are turned in opposite directions. Each of these links comprises at one end a pair of arms 57 adapted to carry a link pin 58, and at the other end a pair of arms 59 adapted to carry a link pin 60 at right angles to the link pin 58. Hence a sprocket which engages only the link pins 60 permits the same to turn in a plane perpendicular to the axis of these pins, whereas a sprocket which engages only the link pins 58 permits the chain to turn in a plane at right angles to these pins and to the first plane.

The chain links are provided with pads 61 forming a substantially continuous surface cooperating with the periphery of the rotating table to hold the cleaned fiber in the same manner as the member 27 of Figs. 1–7. These pads 61 may be mounted on the chain in any suitable manner and as shown they are riveted at 62 to one of the arms 59 adjacent each of the link pins 60. The abutting ends of the pads are curved at 63 to accommodate the turning of the chain on the link pins 60, and sufficient clearance is provided between the abutting ends of the pads to permit turning of the chain about the links pins 58. These pads form a substantially continuous surface around the periphery of the table and are provided with grooves 64 which cooperate with ribs 65 on the table for holding the cleaned fiber as described above. A suitable chain carrier 66 may be provided where desired.

Figs. 8, 11 and 12 show the course of the chain whereby the pads which leave the table beyond the scutching wheel for the purpose of discharging the clean fiber are brought back against the periphery of the wheel to engage the elevated cleaned fiber at a point corresponding to the end 34 of the member 27 described above. As the chain leaves the scutching wheel, it passes over a vertical sprocket 67 and moves in a downwardly inclined path as shown at 68 to a second vertical sprocket 69, this incline corresponding to the discharge extension 33 of the previous embodiment. The chain then descends vertically at 70 to a vertical sprocket 71 at right angles to the sprockets 67 and 69 which turns the chain into a horizontal path indicated at 72 with the pads 61 on the bottom. The chain then passes around a horizontal sprocket 73 and a vertical sprocket 74 parallel to the sprockets 67 and 69. Thus the chain travels a vertical path 75 to a vertical sprocket 76 parallel to the sprocket 71, and then a horizontal path 77 leading back toward the periphery of the table with the pads 61 on the proper side of the chain for engagement with the table as described above. The chain may be driven by any desired sprocket and for purposes of illustration a motor 78 has been shown connected to a driving sprocket 79 adjacent the point at which the chain again joins the periphery of the table.

While only two embodiments have been described and illustrated, it will be apparent to those skilled in the art that the invention is not limited to these embodiments but may have a variety of mechanical forms without departing from its spirit, and also that various changes may be made in the form, details of construction and arrangement of the parts. Hence reference should be had to the appended claims for a definition of the limits of the invention.

What is claimed is:

1. In apparatus of the class described, a rotating table adapted to receive leaves to be cleaned, a scutching support beneath the periphery of said table at one side thereof and a scutching wheel cooperating with said support, stationary leaf holding means cooperating with the upper marginal surface of said table and adapted to hold one end of a leaf on the table with the other end hanging down over said scutching support, additional stationary means located beyond said scutching wheel for elevating the depending cleaned end while the uncleaned end is thus held, means cooperating with the periphery of the table for engaging and holding the elevated cleaned end, and means for thereafter overturning the uncleaned end of the leaf to hang down over said peripheral holding means, said peripheral holding means extending continuously from the point of engagement of said cleaned end to and beyond said scutching wheel.

2. Apparatus as claimed in claim 1 wherein said peripheral holding means comprises a stationary bar curved to cooperate with the periphery of the table.

3. Apparatus as claimed in claim 1 wherein said peripheral holding means comprises a chain running in engagement with the periphery of the table.

4. In apparatus of the class described, a rotating table adapted to receive leaves to be cleaned, a scutching support beneath the periphery of the table at one side thereof and a scutching wheel cooperating with said support, stationary leaf holding means cooperating with the upper marginal surface of said table and adapted to hold one end of a leaf on the table with the other end hanging down over said support, a stationary inclined member beyond said wheel for elevating an intermediate part of the leaf and the cleaned end therewith while the uncleaned end is thus held, means cooperating with the periphery of the table for engaging and holding the elevated cleaned end, and means for thereafter overturning the uncleaned end of the leaf to hang down over said peripheral holding means, said peripheral holding means extending continuously from the point of engagement of said cleaned end to and beyond said scutching wheel.

5. In apparatus of the class described, a rotating table adapted to receive leaves to be cleaned, a scutching support beneath the periphery of said table at one side thereof and a scutching wheel cooperating with said support, stationary leaf holding means cooperating with the upper marginal surface of said table and adapted to hold one end of a leaf on the table with the other end overhanging down over said support, additional stationary means located beyond said wheel for elevating the depending cleaned end while the uncleaned end is thus held, means cooperating with the periphery of the table for engaging and holding the elevated cleaned end, and means for thereafter overturning the uncleaned end of the leaf to hang down over said peripheral holding means, said peripheral holding means extending continuously from the point of engagement of said cleaned end to and beyond said scutching wheel, said scutching wheel carrying a plurality of blades wiping over said scutching support to remove pulpy matter from the leaf and a plurality of brushes for brushing the de-pulped fiber.

6. In apparatus of the class described, a rotating table adapted to receive leaves to be cleaned, a scutching support beneath the periphery of the table at one side thereof and a scutching wheel cooperating with said support, stationary leaf holding means cooperating with the upper marginal surface of said table and adapted to hold one end of a leaf on the table with the other end hanging down over said support, a stationary inclined member beyond said wheel for elevating an intermediate part of the leaf and the cleaned end therewith while the uncleaned end is thus held, means cooperating with the periphery of the table for engaging and holding the elevated cleaned end, and means for thereafter overturning the uncleaned end of the leaf to hang down over said peripheral holding means, said peripheral holding means extending continuously from the point of engagement of said cleaned end to and beyond said scutching wheel, said scutching wheel carrying a plurality of blades wiping over said scutching support to remove pulpy matter from the leaf and a plurality of brushes for brushing the de-pulped fiber.

7. Apparatus as claimed in claim 6 wherein said peripheral holding means comprises a stationary bar curved to cooperate with the periphery of the table.

8. Apparatus as claimed in claim 6 wherein said peripheral holding means comprises a chain running in engagement with the periphery of the table.

9. Apparatus of the class described comprising a rotating table adapted to receive leaves to be cleaned, a scutching support beneath the periphery of said table at one side thereof and a scutching wheel cooperating with said support, inner peripheral leaf holding means cooperating with the periphery of said table and extending past said scutching wheel, outer peripheral leaf holding means cooperating with said first means and extending past the scutching wheel, the leaf being bent down between said inner and outer peripheral holding means with its end hanging down over said support as it passes said wheel, means located between the end of said outer holding means and the beginning of said inner holding means for elevating the depending cleaned end of the leaf, said elevated end being thereafter engaged between said inner means and the periphery of the table, and means for thereafter overturning the uncleaned end of the leaf to hang down over said inner holding means before it reaches the beginning of said outer means.

10. Apparatus of the class described comprising a rotating table adapted to receive leaves to be cleaned at one side thereof, a scutching support beneath the periphery of the table at a point beyond the receiving station in the direction of rotation, a scutching wheel cooperating with said support, leaf holding means cooperating with the periphery of the table and extending from a point ahead of the receiving station past said station and scutching wheel, and terminating in a discharge extension at one side of the table, a second leaf holding means cooperating peripherally with said first holding means and extending from a point beyond said receiving station past said scutching wheel to a point short of said discharge extension, means for holding one end of a leaf on the table top with the leaf bent down between said first and second holding means and its other end hanging over said support, means for elevating the cleaned end of the leaf before it reaches the beginning of said first holding means, whereby the elevated end is engaged between said first holding means and the periphery of the table, and means for thereafter overturning the uncleaned end of the leaf to hang down over said first holding means.

11. Apparatus of the class described comprising a scutching wheel, a scutching support substantially concentric therewith, and means for feeding leaves to be cleaned past said support with their ends hanging down thereover, said wheel carrying a scutching device extending transversely of its periphery at an angle to the wheel axis, said device comprising an arcuate surface adapted to crush the leaves against said support followed by a scraper blade of greater radial extent from the wheel axis for stripping the pulpy matter from the fiber, the surface of said support being grooved in the direction of movement of said blade.

12. Apparatus of the class described comprising a scutching wheel, a scutching support substantially concentric therewith, and means for feeding leaves to be cleaned past said support with their ends hanging down thereover, said wheel carrying a scutching device extending transversely of its periphery at an angle to the wheel axis, said device comprising an arcuate surface adapted to crush the leaves against said support followed by a scraper blade of greater radial extent from the wheel axis for stripping the pulpy matter from the fiber, the radial extent from the wheel axis of said arcuate surface and said blade decreasing toward the side of the wheel which the leaves approach, the surface of said support being grooved in the direction of movement of said blade.

JOHN S. REEVES.